(12) United States Patent
Kang et al.

(10) Patent No.: US 9,015,347 B2
(45) Date of Patent: Apr. 21, 2015

(54) METHOD AND APPARATUS FOR TRANSMITTING A MESSAGE AS AN IMAGE

(75) Inventors: Min-kyoung Kang, Suwon-si (KR); Sung-wook Ahn, Seoul (KR); Eun Namgung, Hwaseong-si (KR); Jong-ho Lee, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 369 days.

(21) Appl. No.: 13/438,889

(22) Filed: Apr. 4, 2012

(65) Prior Publication Data

US 2012/0259932 A1 Oct. 11, 2012

(30) Foreign Application Priority Data

Apr. 6, 2011 (KR) ........................ 10-2011-0031801

(51) Int. Cl.
*G06F 15/16* (2006.01)
*H04L 12/58* (2006.01)

(52) U.S. Cl.
CPC ............ *H04L 51/38* (2013.01); *H04L 12/5835* (2013.01); *H04L 51/066* (2013.01)

(58) Field of Classification Search
CPC .................. H04L 51/66–51/066; H04L 51/36; H04L 12/5825–12/5835; H04L 12/589; G06F 17/30861–17/30896; H04M 3/42382
USPC .......... 709/204–207, 217–219, 246; 370/910; 455/414.4
See application file for complete search history.

(56) References Cited

U.S. PATENT DOCUMENTS

| | | | |
|---|---|---|---|
| 7,865,198 B2 * | 1/2011 | Shin | 455/466 |
| 8,583,732 B2 * | 11/2013 | Bae et al. | 709/204 |
| 2001/0048436 A1 * | 12/2001 | Sanger | 345/467 |
| 2004/0215721 A1 * | 10/2004 | Szeto et al. | 709/204 |
| 2006/0031369 A1 * | 2/2006 | Caron et al. | 709/207 |
| 2006/0099997 A1 * | 5/2006 | Ara | 455/566 |
| 2006/0122883 A1 * | 6/2006 | Lynn | 705/14 |
| 2006/0128364 A1 * | 6/2006 | Costa-Requena et al. | 455/414.3 |
| 2008/0008114 A1 * | 1/2008 | Kaarela et al. | 370/328 |
| 2008/0016177 A1 * | 1/2008 | Jin et al. | 709/217 |
| 2008/0098079 A1 * | 4/2008 | Sanghavi | 709/207 |
| 2008/0209034 A1 * | 8/2008 | Shin et al. | 709/224 |
| 2009/0125599 A1 * | 5/2009 | Koide | 709/206 |
| 2009/0216840 A1 * | 8/2009 | Pajunen et al. | 709/206 |
| 2010/0040211 A1 * | 2/2010 | Maeng et al. | 379/93.15 |
| 2010/0151888 A1 * | 6/2010 | Baek | 455/466 |
| 2010/0281093 A1 * | 11/2010 | Poder et al. | 709/201 |
| 2011/0002012 A1 * | 1/2011 | Amagai | 358/3.28 |
| 2011/0037767 A1 * | 2/2011 | Casanova et al. | 345/473 |
| 2011/0047219 A1 * | 2/2011 | Tripathi et al. | 709/206 |
| 2011/0096354 A1 * | 4/2011 | Liu | 358/1.15 |
| 2011/0099238 A1 * | 4/2011 | Du | 709/206 |
| 2011/0125860 A1 * | 5/2011 | Bao et al. | 709/206 |
| 2011/0183691 A1 * | 7/2011 | Kwon et al. | 455/466 |
| 2011/0238761 A1 * | 9/2011 | Mizokami | 709/206 |

(Continued)

FOREIGN PATENT DOCUMENTS

JP 2005235152 A * 9/2005

*Primary Examiner* — Patrice Winder
*Assistant Examiner* — Julian Chang
(74) *Attorney, Agent, or Firm* — Sughrue Mion, PLLC

(57) ABSTRACT

A message to be transmitted is converted into an image file. The image file is stored and location information about a location where the image file is stored, is generated. The image file is transmitted to at least one device based on the location information.

23 Claims, 15 Drawing Sheets

(56) References Cited

U.S. PATENT DOCUMENTS

| | | | |
|---|---|---|---|
| 2011/0276641 A1* | 11/2011 | Polis et al. | 709/206 |
| 2012/0071706 A1* | 3/2012 | Martin | 600/27 |
| 2012/0138671 A1* | 6/2012 | Gaede et al. | 235/375 |
| 2012/0149404 A1* | 6/2012 | Beattie et al. | 455/466 |
| 2012/0151006 A1* | 6/2012 | McInerney et al. | 709/219 |
| 2012/0173650 A1* | 7/2012 | Ye et al. | 709/206 |
| 2012/0173755 A1* | 7/2012 | Margulis | 709/231 |
| 2012/0210200 A1* | 8/2012 | Berger et al. | 715/202 |
| 2012/0223131 A1* | 9/2012 | Lim et al. | 235/375 |
| 2012/0310733 A1* | 12/2012 | Lynn | 705/14.46 |
| 2013/0006848 A1* | 1/2013 | Kuttuva | 705/39 |
| 2013/0124656 A1* | 5/2013 | Peng | 709/206 |
| 2013/0146655 A1* | 6/2013 | Gandhi | 235/375 |
| 2013/0159445 A1* | 6/2013 | Zonka et al. | 709/206 |
| 2013/0196697 A1* | 8/2013 | Lew et al. | 455/466 |
| 2014/0036024 A1* | 2/2014 | MAENG et al. | 348/14.01 |

* cited by examiner

FIG. 4B
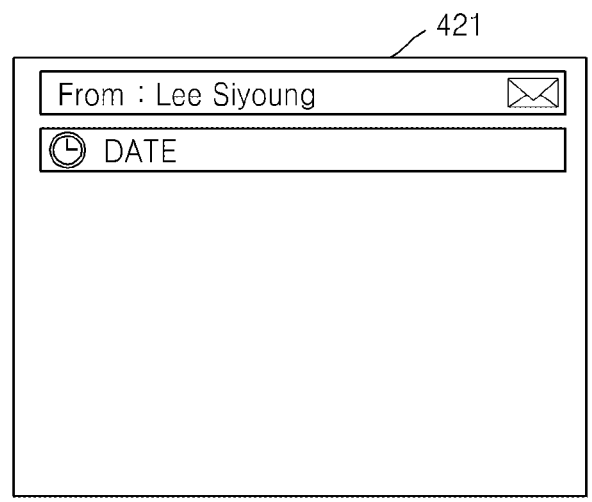
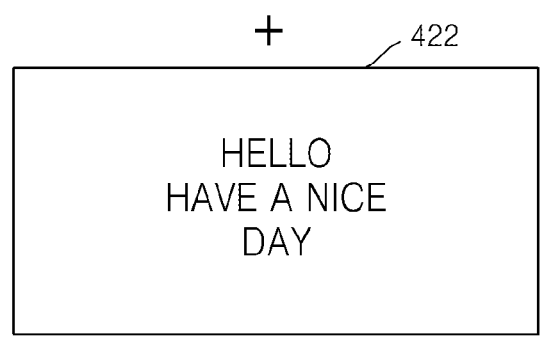
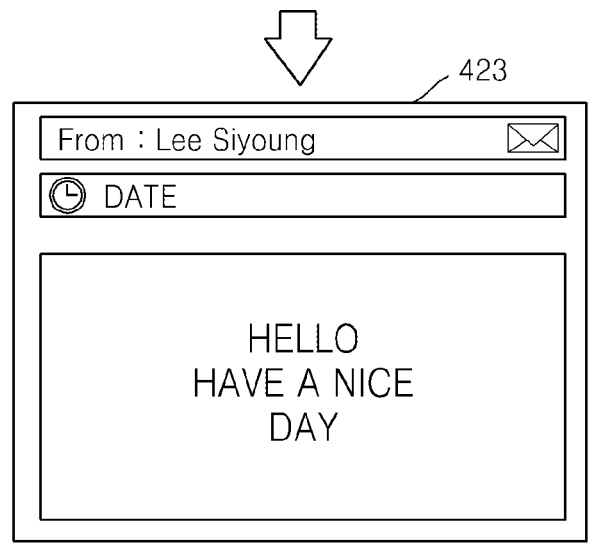

FIG. 4C
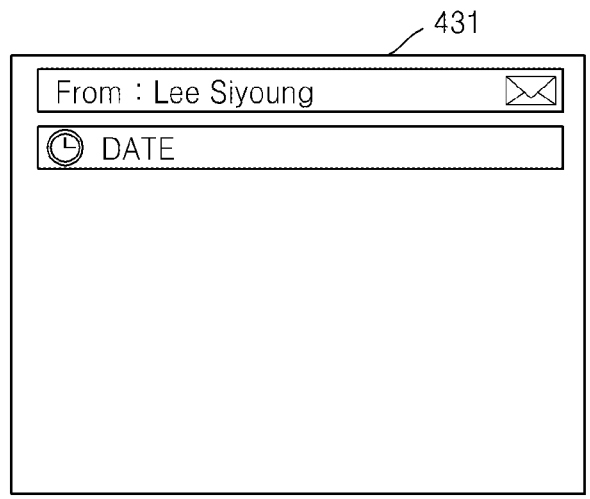
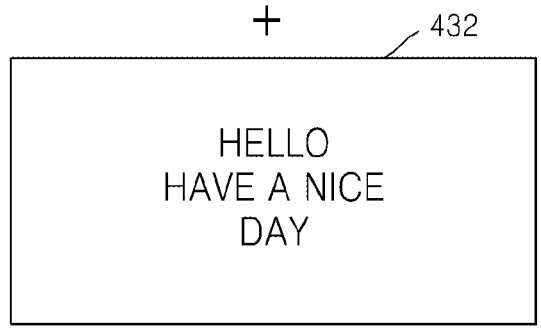
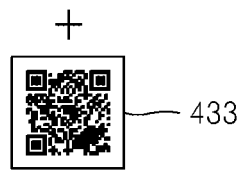

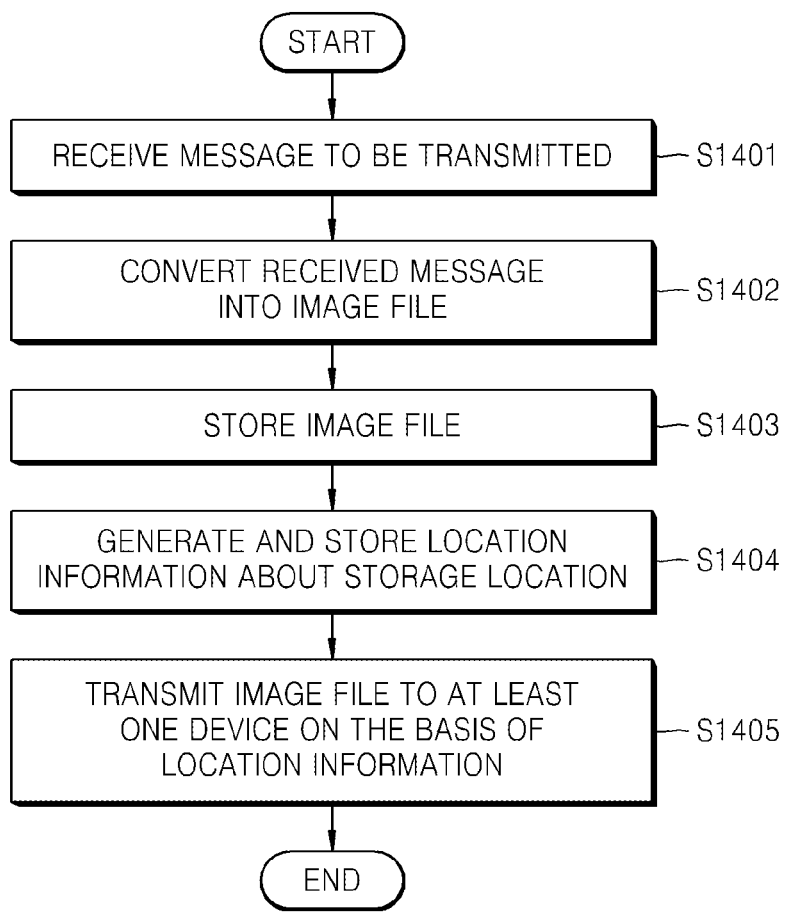

METHOD AND APPARATUS FOR TRANSMITTING A MESSAGE AS AN IMAGE

CROSS-REFERENCE TO RELATED PATENT APPLICATION

This application claims priority from Korean Patent Application No. 10-2011-0031801, filed Apr. 6, 2011, in the Korean Intellectual Property Office, the disclosure of which is incorporated herein in its entirety by reference.

BACKGROUND

1. Field

Apparatuses and methods consistent with exemplary embodiments relate to transmitting a message, and more particularly, to transmitting a message such as a text-based or multimedia-based message between devices.

2. Description of the Related Art

Recently, various wireless networks have appeared, and coverage of a wireless network has been increased. Also, a price of a communication module has been decreased, and various sensor technologies have been proposed. With such significant advances in technology, a machine-to-machine (M2M) communication technology has received a great deal of attention. The M2M communication makes it possible to transmit data between devices via a wired or wireless network without interaction with a person. A message transmission mechanism such as a short message service (SMS) based on the M2M communication has recently become more popular.

SUMMARY

Exemplary embodiments may address at least the above problems and/or disadvantages and other disadvantages not described above. Also, exemplary embodiments are not required to overcome the disadvantages described above, and an exemplary embodiment of the present inventive concept may not overcome any of the problems described above.

Exemplary embodiments provide a method and a device for transmitting message based on M2M communication, and a computer-readable storage medium.

Exemplary embodiments also provide a method and a device capable of visualizing a message such as a text-based or multimedia-based message to transmit it between devices, and a computer-readable storage medium.

Exemplary embodiments also provide a method and a device capable of transmit a message to a device not capable of receiving a message such as a text-based or multimedia-based message, and a computer-readable storage medium.

Exemplary embodiments also provide a method and a device capable of transmit a message to a home-based device not capable of receiving a message such as a text-based or multimedia-based message, and a computer-readable storage medium.

According to an aspect of an exemplary embodiment, there is provided a method of transmitting a message in a device capable of transmitting a message, the method including converting a message to be transmitted into an image file; storing the image file and generating location information about a location where the image file is stored; and transmitting the image file to at least one device on the basis of the location information.

The method may further include receiving the message to be transmitted from an external device.

The method may further include receiving the message to be transmitted from a user interface unit.

The transmitting of the image file to at least one device on the basis of the location information may include determining whether the at least one device is capable of receiving the message on the basis of management information of the at least one device; transmitting the image file to the at least one device on the basis of a technology of sharing contents between devices if the at least one device is not capable of receiving the message; and transmitting the location information to the at least one device to thereby transmit the image file to the at least one device if the at least one device is capable of receiving the message.

The transmitting of the image file to the at least one device may include transmitting the location information and identification information of the at least one device to a gateway; and transmitting the image file to the gateway when a request for downloading the image file is received from the gateway on the basis of the location information, wherein the gateway is connected to the at least one device, and has a function of sharing contents with the at least one device on the basis of the contents sharing technology.

The transmitting of the location information to the at least one device may include transmitting the location information to the at least one device; and transmitting the image file to the at least one device when a request for downloading the image file is received from the at least one device on the basis of the location information.

The method may further include combining a template graphic user interface with an image of the image file.

The method may further include generating information for linkage to meta-data of the image file; and combining the information for linkage to meta-data with the image of the image file.

The information for linkage to meta-data may include at least one of a face image of an object included in the image and a quick response (QR) code.

The method may further include generating information for linkage to meta-data of the image file; and combining the information for linkage to meta-data with the image of the image file.

The message may include a text-based message and a multimedia-based message.

According to another aspect of an exemplary embodiment, there is provided a message transmitting device including a storage unit storing an image file of a message to be transmitted and location information about a location where the image file is stored; a processor converting the message to be transmitted into the image file, generating the location information if the image file is stored into the storage unit, and controlling the storage unit for storing the location information into the storage unit; and transmitting unit controlled by the processor and transmitting the image file to at least one device.

The message transmitting device may further include a user interface unit inputting the message to be transmitted.

The message transmitting device may further include a receiving unit receiving the message to be transmitted from an external device.

The storage unit may further store a management information table of the at least one device, and the processor may search the management information table for management information of a device to which the message is to be transmitted, determine whether the device to which the message is to be transmitted is capable of receiving the message on the basis of the searched management information, and control transmitting the image file according to a result of the determination.

The processor may control the transmitting unit for transmitting the location information and identification information of the device to which the message is to be transmitted to a gateway through the transmitting unit if the device to which the message is to be transmitted is not capable of receiving the message according to the result of the determination, and control the transmitting unit for transmitting the location information to the device to which the message is to be transmitted through the transmitting unit if the device to which the message is to be transmitted is capable of receiving the message according to the result of the determination, wherein the gateway may be connected to the at least one device, and transmit an image file corresponding to the message to the at least one device on the basis of a technology of sharing contents between devices.

The processor may combine a template graphic user interface with an image of the image file.

The processor may generate information for linkage to meta-data of the image file, and combine the generated information for linkage to meta-data with the image of the image file.

According to another aspect of an exemplary embodiment, there is provided a recording medium recording a computer program for implementing a message transmitting method, wherein the message transmitting method is performed in the same manner as described above.

BRIEF DESCRIPTION OF THE DRAWINGS

The above and/or other aspects will become more apparent by describing certain exemplary embodiments, with reference to the accompanying attached drawings, in which:

FIGS. 4A, 4B, and 4C illustrate a text-based message to be transmitted and an image included in an image file corresponding to the text-based message according to an exemplary embodiment;

FIG. 14 is a flowchart illustrating a message transmitting method according to another exemplary embodiment.

DETAILED DESCRIPTION

Figure 1:
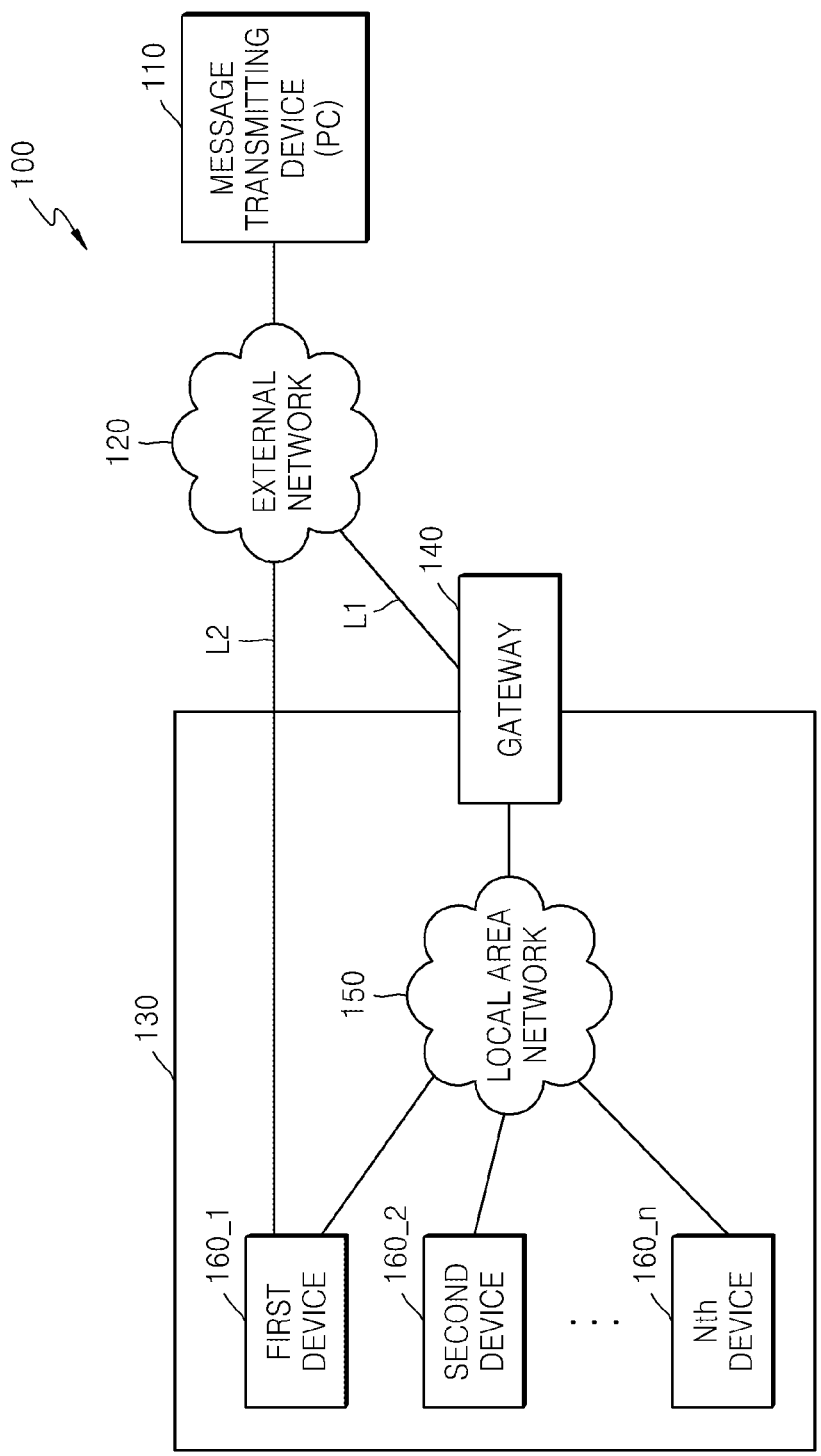
FIG. 1 is a diagram illustrating an exemplary configuration of a network according to an exemplary embodiment.

Certain exemplary embodiments are described in greater detail below with reference to the accompanying drawings.

In the following description, like drawing reference numerals are used for the like elements, even in different drawings. The matters defined in the description, such as detailed construction and elements, are provided to assist in a comprehensive understanding of exemplary embodiments. However, exemplary embodiments can be carried out without those specifically defined matters. Also, well-known functions or constructions are not described in detail since that would obscure the invention with unnecessary detail.

FIG. 1 is a diagram illustrating a configuration of a network 100 based on a message transmitting device 110 according to an exemplary embodiment, wherein a message inputted using the message transmitting device 110 is transmitted to at least one other device. The message may include a text-based message such as an SMS message or a multimedia-based message such as a multimedia message service (MMS) message transmitted based on the 2nd generation (2G) technology or 3rd generation (3G) technology.

Referring to FIG. 1, the network 100 includes the message transmitting device 110 according to an exemplary embodiment, an external network 120, and an area 130 where a gateway 140 is connectable to first to nth devices 160_1 to 160_n via a local area network 150.

The message transmitting device 110 is capable of inputting the 2G or 3G-based message, directly visualizing the inputted 2G or 3G-based message without parsing the inputted 2G or 3G-based message and transmitting the visualized message according to an exemplary embodiment. The message transmitting device 110 may include functions of at least one of the message input and network connection. The message transmitting device may be configured as a personal computer (PC)-based device or a mobile device.

Figure 2:
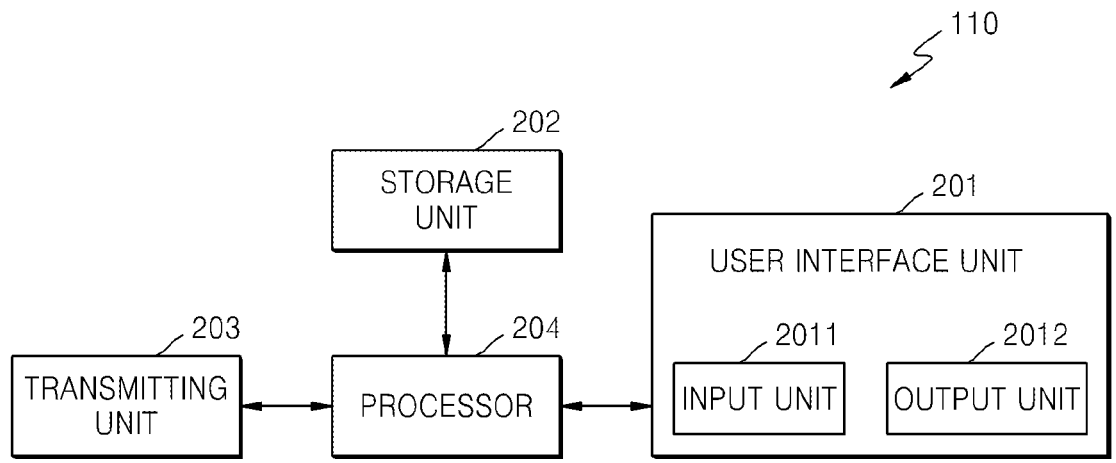
FIG. 2 is a function diagram illustrating the message transmitting device illustrated in FIG. 1.

The message transmitting device 110 may be constituted as illustrated in FIG. 2. Referring to FIG. 2, the message transmitting device 110 may include a user interface unit 201, a storage unit 202, a transmitting unit 203, and a processor 204.

The user interface unit 201 interacts between the message transmitting device 110 and a user. The user interface unit 201 may receive input signals such as a touch-based signal, a keyboard-based signal, a mouse-based signal, and/or a camera-based signal; however, the input signal is not limited thereto.

The user interface unit 201 may include an input unit 2011 for inputting an input signal, and an output unit 2012 for outputting an output signal. A signal inputted through the user interface unit 201 may be a signal inputted through the input unit 2011. According to an exemplary embodiment, the input unit 2011 may input a text-based message or a multimedia-based message. For inputting the multimedia-based message, the input unit 2011 may include a camera-based function or a photographing-based function. In the case that the input unit 2011 includes the camera-based function or the photographing-based function, the input unit 2011 may input a photographed image as the input signal.

A signal outputted through the user interface unit 201 may be a signal outputted through the output unit 2012. The output unit 2012 may be a display device. In the case that the output unit 2012 is a display device, the output unit 2012 may be a liquid crystal display (LCD), a light-emitting diode (LED), an active-matrix organic light-emitting diode (AMOLED), or the like. However, the user interface unit 201 is not limited to the above description.

An image file for a message to be transmitted and information about a location, where the image file is stored, may be stored into the storage unit 202. A management information table for at least one device to which a message is to be transmitted may be further stored into the storage unit 202. In the configuration of FIG. 1, a management information table for the first to nth devices 160_1 to 160_n included in the area 130 may be stored into the storage unit 202. However, a management information table stored in the storage unit 202 is not limited to the management information table for the first to nth devices 160_1 to 160_n.

The management information table stored in the storage unit 202 may be configured to include message recipient information of each device, identification information of devices, information about whether Digital Living Networking Alliance (DLNA) is supported, and telephone number information as shown in Table 1 below; however, the configuration is not limited thereto. The DLNA supportability information written in Table 1 may be changed to information about whether a corresponding device is capable of receiving the 2G or 3G-based message. The telephone number information may be connection information. The device identification may be unique information assigned by a device manufacturer.

TABLE 1

| Recipient information | Device identification information (ID) | DLNA supportability | Telephone number |
| --- | --- | --- | --- |
| #123619 | Device_D_www_zzz (digital photo frame) | Non_DLNA | 010-XXXX-XXXX |
| #123611 | Device_D_xxx_yyy (TV) | DLNA | None |

The image file stored in the storage unit 202 may include an image obtained by combining an image corresponding to a message itself with predetermined template graphic user interface information, an image obtained by combining the image corresponding to a message itself with information for linkage to meta-data of the image file, or an image obtained by combining the image corresponding to a message itself with both of the template graphic user interface information and the meta-data linkage information. The information for linkage to the meta-data of the image file and the template graphic user interface information is described in detail below with reference to FIGS. 4 and 5.

A program for implementing message transmitting methods according to exemplary embodiments may be stored into the storage unit 202. The program may be a code object. The program may be pre-stored into the storage unit 202, or may be downloaded from an application store (not shown), a particular website (not shown), or a program providing server (not shown) connected through the transmitting unit 203 under control of the processor 204.

The transmitting unit 203 may be controlled by the processor 204 for transmitting/receiving data between the processor 204 and the external network 120. Therefore, the transmitting unit 203 may be a network interface unit. According to an exemplary embodiment, the transmitting unit 203 may transmit an image file corresponding to a message to be transmitted stored in the storage unit 202 to at least one of the first to nth devices 160_1 to 160_n included in the area 130. A device to which a message is transmitted is not limited to the first to nth devices 160_1 to 160_n.

Data which are transferable through the transmitting unit 203 according to an exemplary embodiment is described in detail below. The transmitting unit 203 may be configured according to a communication technology used in the external network 120 which is also described in detail below. For instance, where the external network 120 is configured such that data are transmitted and received via M2M communication, the transmitting unit 203 is configured such that data are transmitted and received between the external network 120 and the processor 204 via the M2M communication.

The processor 204 controls functions of the message transmitting device 110, and may be a controller, a microprocessor, a microcontroller, or the like; however, it is not limited thereto. The processor 204 may load a program for executing a message transmitting method stored in the storage unit 202, and execute the message transmitting method according to an exemplary embodiment. The processor 204 may read the data needed for executing the message transmitting method from the storage unit 202, and the data read from the storage unit 202 may be loaded on the processor 204 to be used. The processor 204 may include a memory or a buffer for storing data. The data may include, for example, template graphic user interface information.

For transmitting a message inputted through the user interface unit 201 to at least one device according to an exemplary embodiment, the processor 204 may convert a message to be transmitted into an image file according to the loaded program. If the image file is stored into the storage unit 202, the processor 204 may generate information of a location where the image file is stored, and control the storage unit 202 for the generated location information to be stored into the storage unit 202. Since the processor 204 converts a message to be transmitted into an image file without parsing the message to be transmitted, a device which receives the message may simplify a process for displaying the received message.

The processor 204 may perform tasks for executing a message transmitting method according to flowcharts of FIGS. 3 and 6 to 9.

Figure 3:
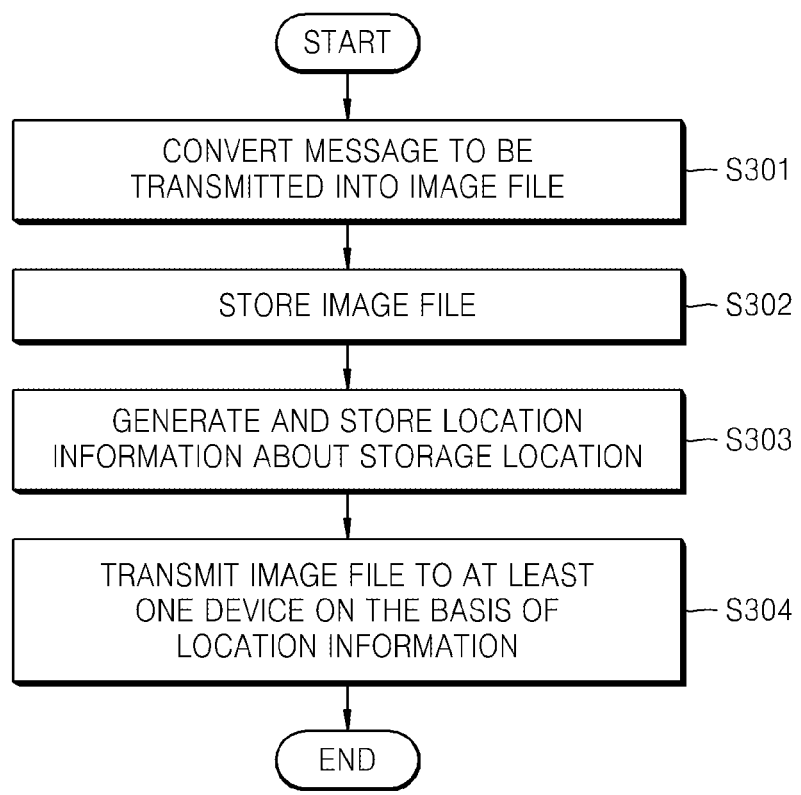
FIG. 3 is a flowchart illustrating a message transmitting method according to an exemplary embodiment.

FIG. 3 is a flowchart illustrating the message transmitting method according to an exemplary embodiment. Referring to FIG. 3, the processor 204 converts a message to be transmitted inputted through the user interface unit 201 into an image file in operation S301. That is, when the message to be transmitted is an SMS message or an MMS message, the processor 204 does not parse this message, but visualizes the message by intactly converting the message into the image file with an image format such as JPG.

Figure 4A:
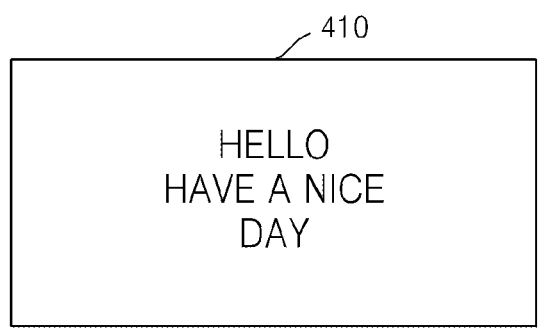

FIG. 4A is an example illustrating a text-based message to be transmitted which is converted into an image 410 included in an image file corresponding to the text-based message according to an exemplary embodiment. When a message to be transmitted is a text-based SMS message, such as "HELLO HAVE A NICE DAY," the processor 204 intactly converts the text-based message into an image file with an image format such as JPG.

Figure 5A:
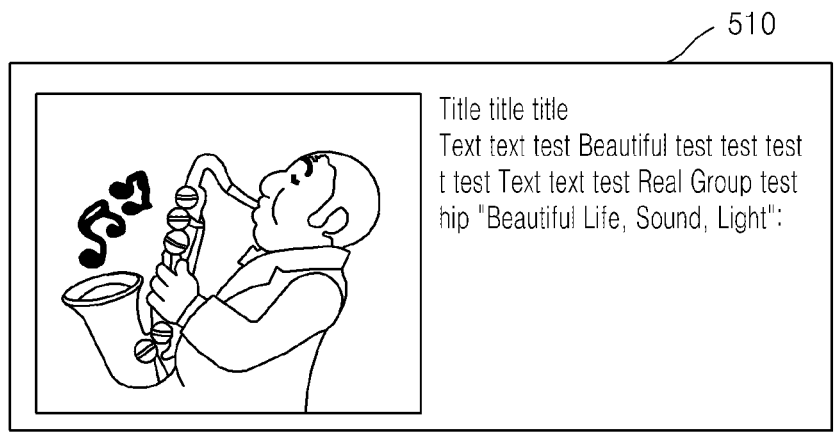
FIGS. 5A, 5B, and 5C illustrate a multimedia-based message to be transmitted and an image included in an image file corresponding to the multimedia-based message according to an exemplary embodiment.

FIG. 5A is an example illustrating a multimedia-based message to be transmitted which is converted into an image 510 included in an image file corresponding to the multimedia-based message according to an exemplary embodiment. When a message to be transmitted is a multimedia-based MMS message including a text and an image, the processor 204 intactly converts the multimedia-based message into an image file with an image format such as JPG.

The processor 204 stores an image file into the storage unit 202 in operation S302. If the image file is stored into the storage unit 202, the processor 204 generates location information of the stored image file based on a location where the image file is stored into the storage unit 202. The location information may be generated in an internet address format such as uniform resource locator (URL). The processor 204 generates and stores the generated location information into the storage unit in operation S303.

The processor 204 transmits the image file stored in the storage unit 202 to at least one device based on the location information stored in the storage unit 202 in operation S304. The at least one device may be one or more devices among the first to nth devices 160_1 to 160_n illustrated in FIG. 1.

Figure 6:
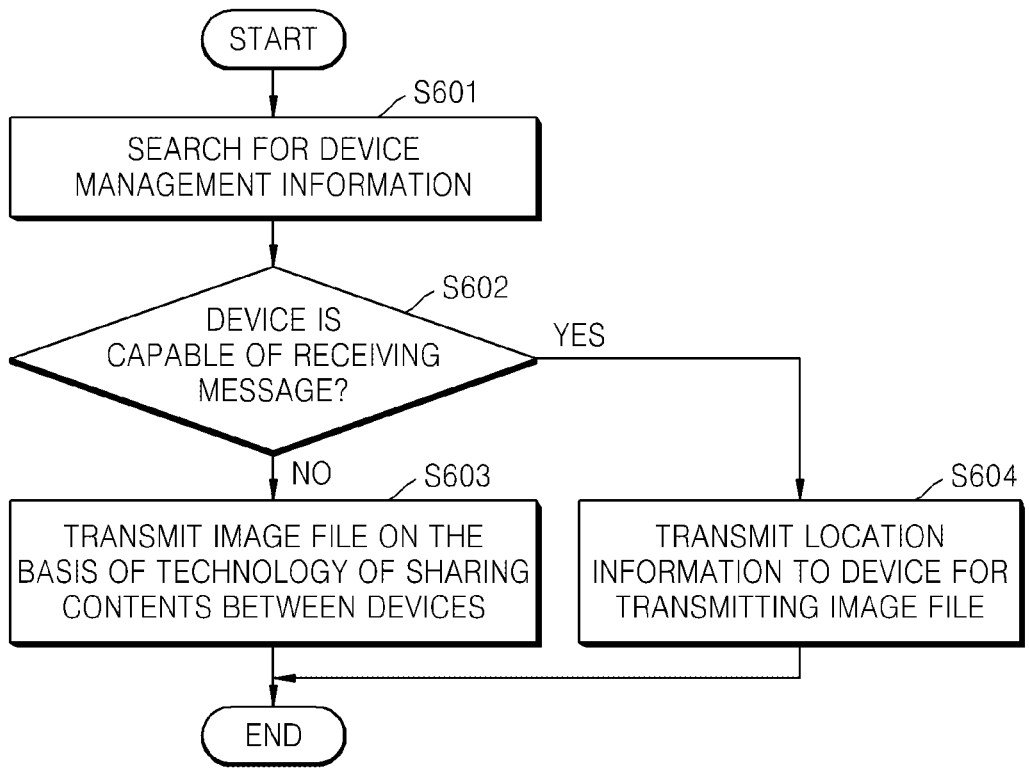
FIG. 6 is a detail of a flowchart illustrated in FIG. 3.

FIG. 6 is a detailed flowchart of operation S304 illustrated in FIG. 3. Referring to FIG. 6, the processor 204 searches the management information table, such as Table 1, stored in the storage unit 202 for management information of a device to which a message is to be transmitted in operation S601. That is, in the case that the management information stored in the storage unit 202 is configured as Table 1, based on the recipient information inputted through the input unit 2011 of the user interface unit 201, the processor 204 searches the management information table stored in the storage unit 202 for the management information of the device to which a message is to be transmitted.

For instance, when the recipient information inputted through the user interface unit 201 is "#123619", the management information which may be found by the processor 204 is "Device_D_www.zzz, Non_DLNA, 010-XXXX-XXXX". When the recipient information inputted through the user interface unit 201 is "#123611", the management information which may be found by the processor 204 is "Device_D_xxx.yyy, DLNA, None".

A user may know the recipient information in advance. However, the processor 204 may obtain the recipient information from the storage unit 202. That is, when the recipient information is registered in advance in the storage unit 202 and the recipient information is requested through the user interface unit 201, the processor 204 outputs a device list corresponding to the recipient information to the output unit 2012. If a device item is selected by the input unit 2011 of the user interface unit 201 based on the outputted device list, the processor 204 may search the storage unit 202 for the recipient information of a device to which a message is to be transmitted according to the selected device item to thereby obtain the recipient information of the device to which a message is to be transmitted.

If the management information of a device has been found in the storage unit 202, the processor 204 determines whether a device to which a message is to be transmitted is capable of directly receiving the message based on the found device management information in operation S602.

In an exemplary embodiment, it is determined whether a corresponding device is capable of directly receiving the message according to whether the device is Non-DLNA based on the found device management information. That is, in the case that the device is Non-DLNA, the processor 204 determines that the device is capable of directly receiving a message. In the case that the device is DLNA, the processor 204 determines that the device is not capable of directly receiving a message. However, in that case that the management information table stored in the storage unit 202 includes information which indicates whether a device is capable of receiving a 2G or 3G-based message, the processor 204 may determine whether a device to which a message is to be transmitted is capable of directly receiving a message based on the information which indicates whether a device is capable of receiving a 2G or 3G-based message.

According to a result of the determination, if the device to which a message is to be transmitted is not capable of directly receiving the message, the processor 204 may perform an operation for transmitting an image file based on a technique of sharing contents between devices using the gateway 140 in operation S603. The technique of sharing contents between devices using the gateway 140 is described in detail below with reference to the gateway 140.

Figure 7:
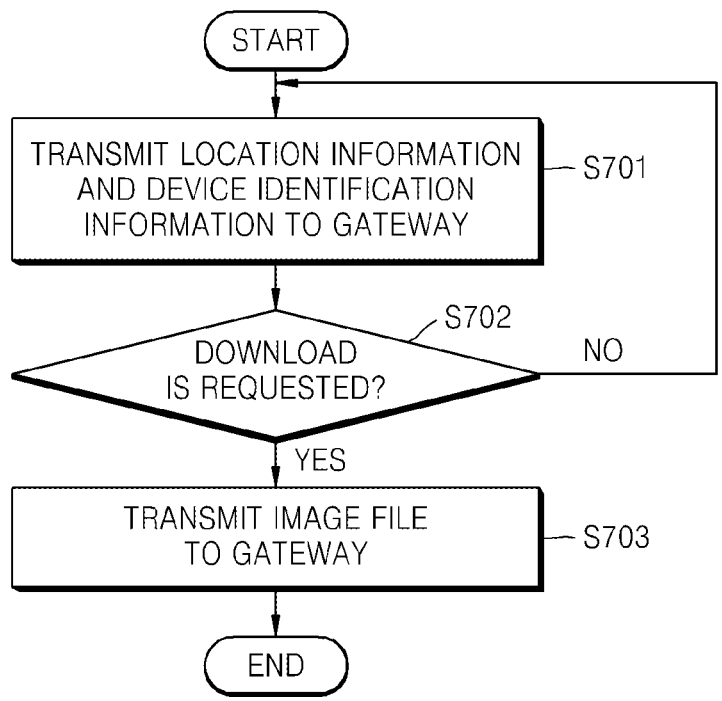
FIG. 7 is a detail of a flowchart illustrated in FIG. 6.

FIG. 7 is a detailed flowchart of operation S603 illustrated in FIG. 6. Referring to FIG. 7, the processor 204 transmits the location information and the device identification information such as Device_D_www_zzz or Device_D_xxx_yyy in an example of Table 1, read from the storage unit 202 to the gateway 140 through a line L1 in operation S701. The line L1 may be a wired or wireless connection according to the configuration of external network 120. An operation of the gateway 140 is described in detail below. If a request for downloading an image file based on location information is received from the gateway 140 in operation S702, the processor 204 transmits an image file stored in the storage unit 202 to the gateway 140 in operation S703.

If it is determined that a device is capable of directly receiving the message in operation S602 of FIG. 6, the processor 204 may directly transmit location information to a corresponding device to transmit an image file in operation S604.

Figure 8:
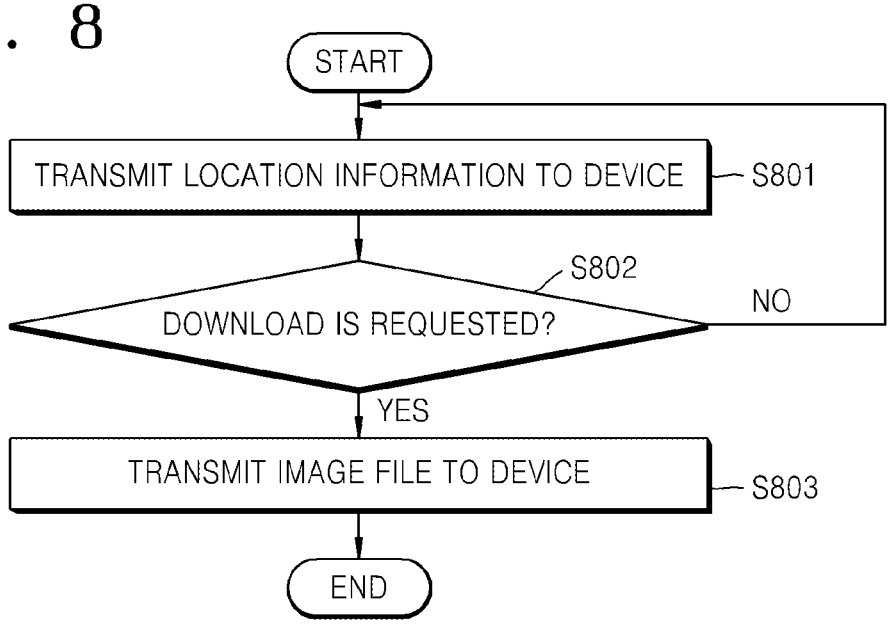
FIG. 8 is a detail of a flowchart illustrated in FIG. 6.

FIG. 8 is a flowchart of operation S604 illustrated in FIG. 6. Referring to FIG. 8, the processor 204 transmits location information to a corresponding device in operation S801. If the corresponding device is the first device 160_1, the processor 204 transmits location information where an image file is stored to the first device 160_1 through a line L2. Like the line L1, the line L2 may be configured as wired or wireless according to the external network 120.

If a request for downloading an image file based on location information is requested by and received from the first device 160_1 (operation S802), the processor 204 reads an image file stored in the storage unit 202 and transmits it to the first device 160_1 through the transmitting unit 203 and the line L2 in operation S803.

Figure 9:
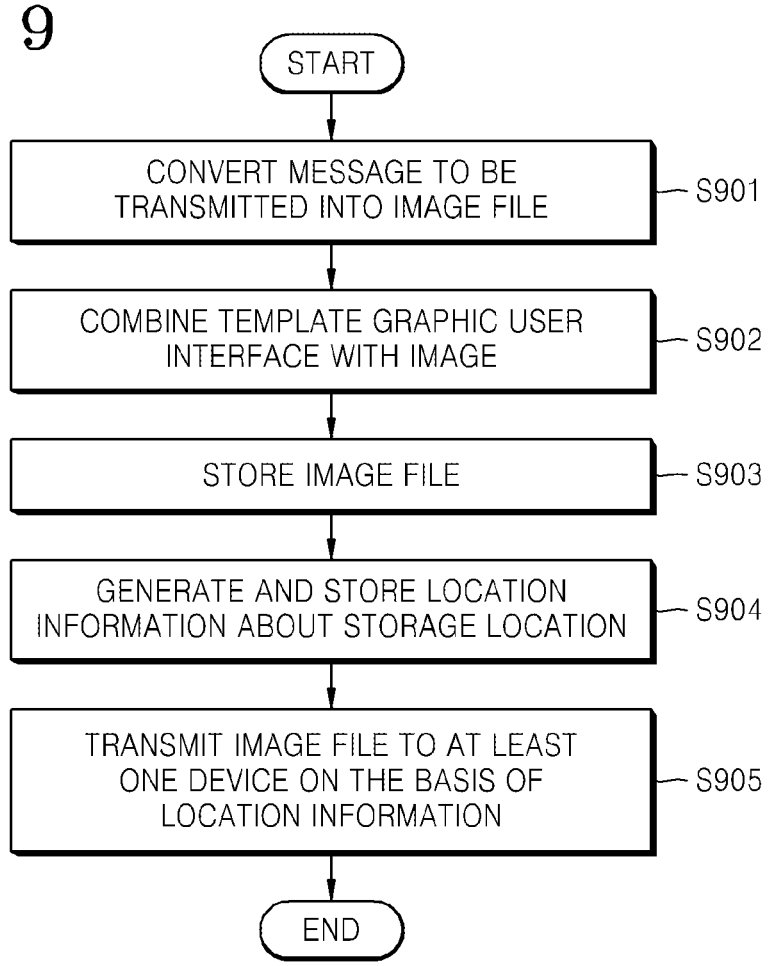
FIG. 9 is a flowchart illustrating a message transmitting method according to another exemplary embodiment.

FIG. 9 is a flowchart illustrating a message transmitting method according to another exemplary embodiment, wherein a function of combining template graphic user interface information with an image of an image file is added in comparison with an exemplary embodiment illustrated in FIG. 3.

Operations S901, S903, S904, and S905 of FIG. 9 are similar to operations S301 to S304 of FIG. 3, thus detailed descriptions for them are omitted.

In operation S902 of FIG. 9, the processor 204 combines template graphic user interface information with an image of a image file corresponding to a message to be transmitted.

That is, for a text-based message, template graphic user interface information such as illustrated, for example, in a block 421 of FIG. 4B is stored in advance into the storage unit 202. The template graphic user interface information 421 is read from the storage unit 202 and is combined with an image 422 of a text-based image file. An image file having an image such as illustrated in a block 423 is stored into the storage unit 202 in operation S903. Although the template graphic user interface information may be stored in advance into the storage unit 202, it may also be inputted through the input unit 2011 of the user interface unit 201 or may be downloaded from a particular website or a server providing graphic user interface information through the transmitting unit 203. An image file transmitted in operation S905 may have an image according to an example illustrated in a block 423 of FIG. 4B.

Figure 5B:
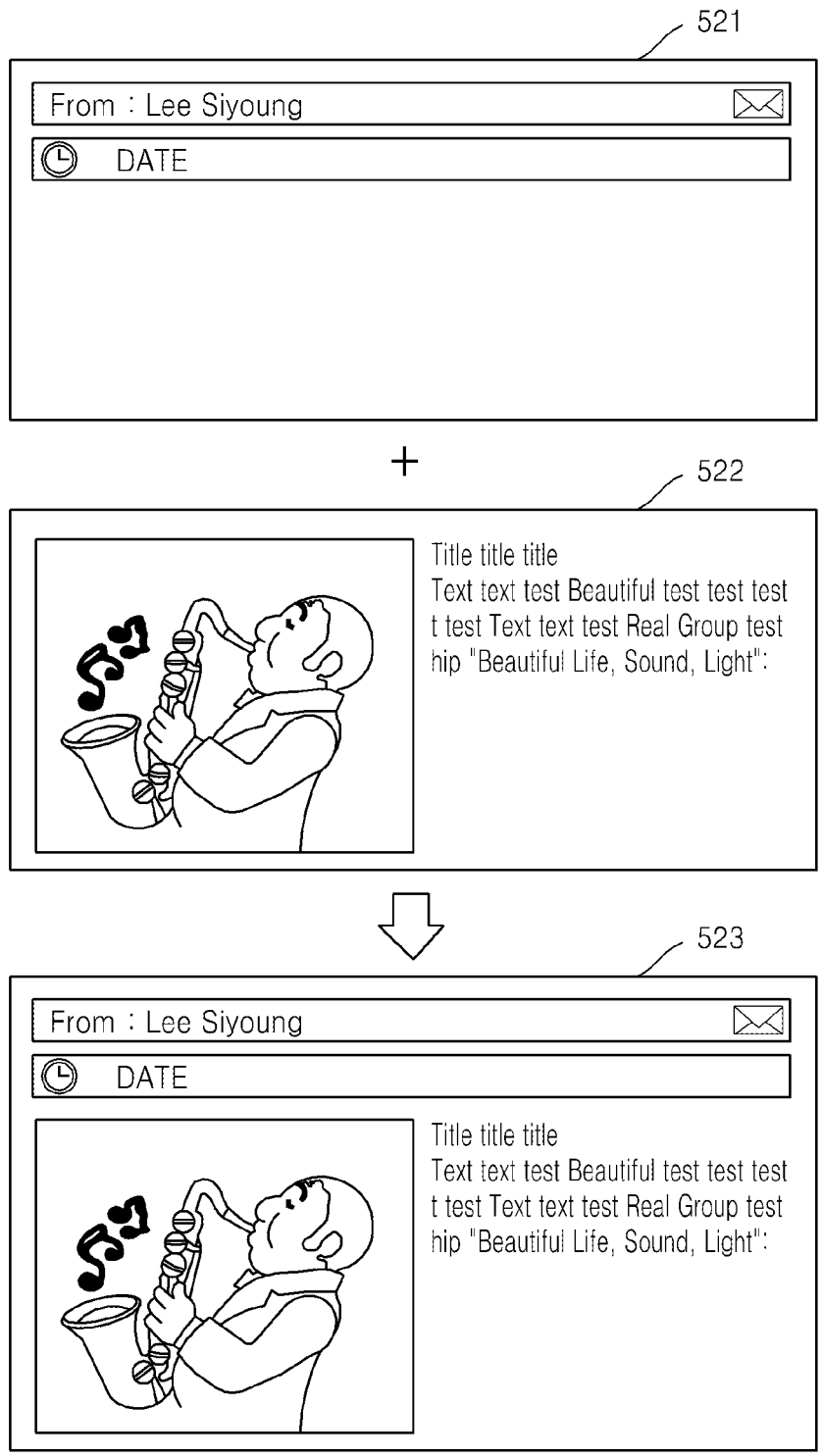

For a media-based message, template graphic user interface information, such as illustrated, for example, in a block 521 of FIG. 5B, is stored in advance into the storage unit 202, the template graphic user interface information is read from the storage unit 202 and is combined with an image 522 of a multimedia-based image file. An image file having an image such as illustrated in a block 523 is stored into the storage unit 202 in operation S903. Accordingly, an image file transmitted in operation 5905 may have an image according to an example illustrated in a block 523 of FIG. 5B.

Figure 10:
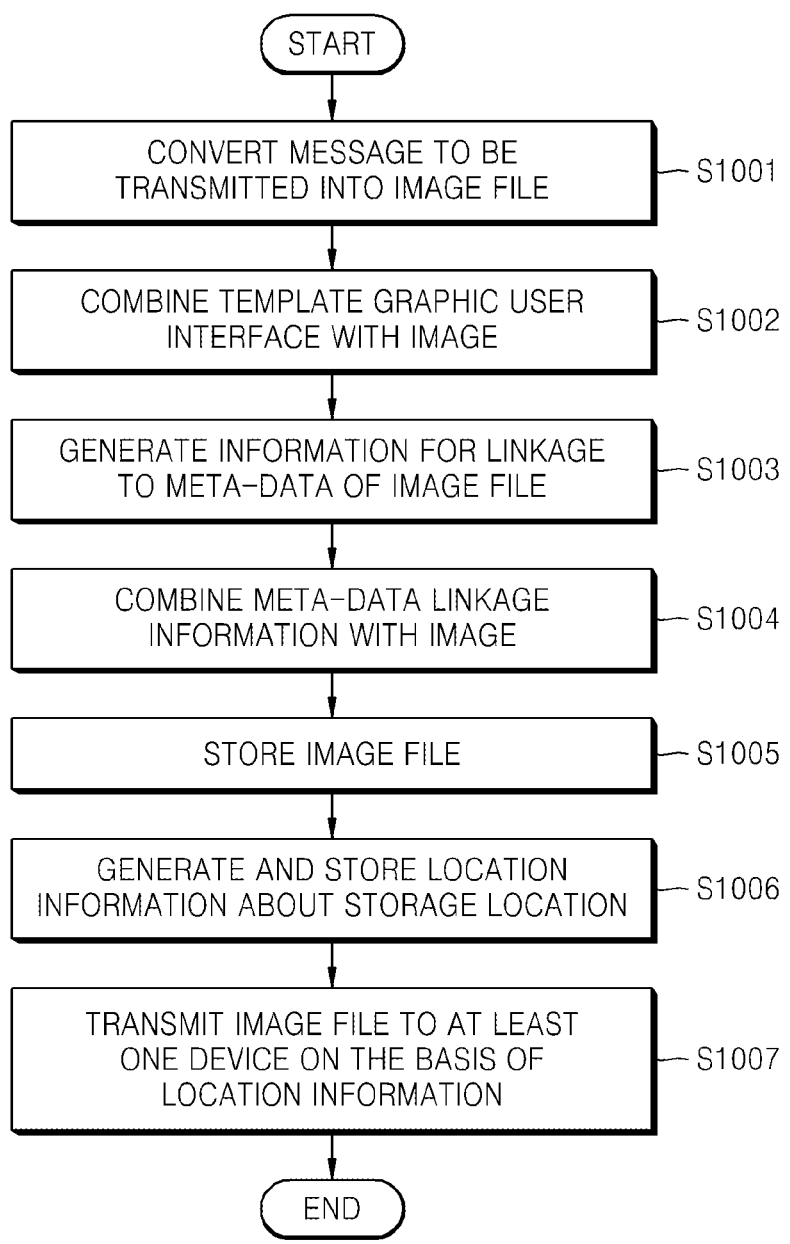
FIG. 10 is a flowchart illustrating a message transmitting method according to another exemplary embodiment.

FIG. 10 is a flowchart illustrating a message transmitting method according to another exemplary embodiment, wherein a function of combining information for linkage to meta-data of an image file with an image is added to an exemplary embodiment illustrated in FIG. 9. Operations S1001, S1002, S1005, S1006, and S1007 of FIG. 10 are substantially similar to operations S901 to S905 of FIG. 9. Thus, detailed descriptions for them are omitted.

In operation S1003 of FIG. 10, the processor 204 generates information for linkage to meta-data of an image file. The information for linkage to meta-data of an image file may include a QR code including information for tracing a location where an image file is stored, or a face image for tracing an object stored in an image file. In the case of the QR code, the processor 204 may generate the QR code based on the location information URL. In the case of the face image, the processor 204 may recognize a face of an object included in an image and generate an image of the recognized face using a technology, such as, for example, a face recognition technology based on a principal component analysis (PCA), a Pure geometry methods, a Dynamic Link architecture method, a Hidden Markov model, a Linear Feature Analysis, etc.

If the information for linkage to meta-data is generated, the processor 204 combines the generated linkage information with an image included in an image file to be transmitted in operation S1004. That is, in the case of generating a QR code such as illustrated in a block 433 of FIG. 4C, the processor 204 stores an image file, which has an image, such as illustrated, for example in a block 434, obtained by combining template graphic user interface information 431, an image 432 corresponding to a message to be transmitted and the QR code 433, into the storage unit 202. Accordingly, an image file transmitted in operation S1007 may have an image corresponding to the block 434.

Figure 5C:
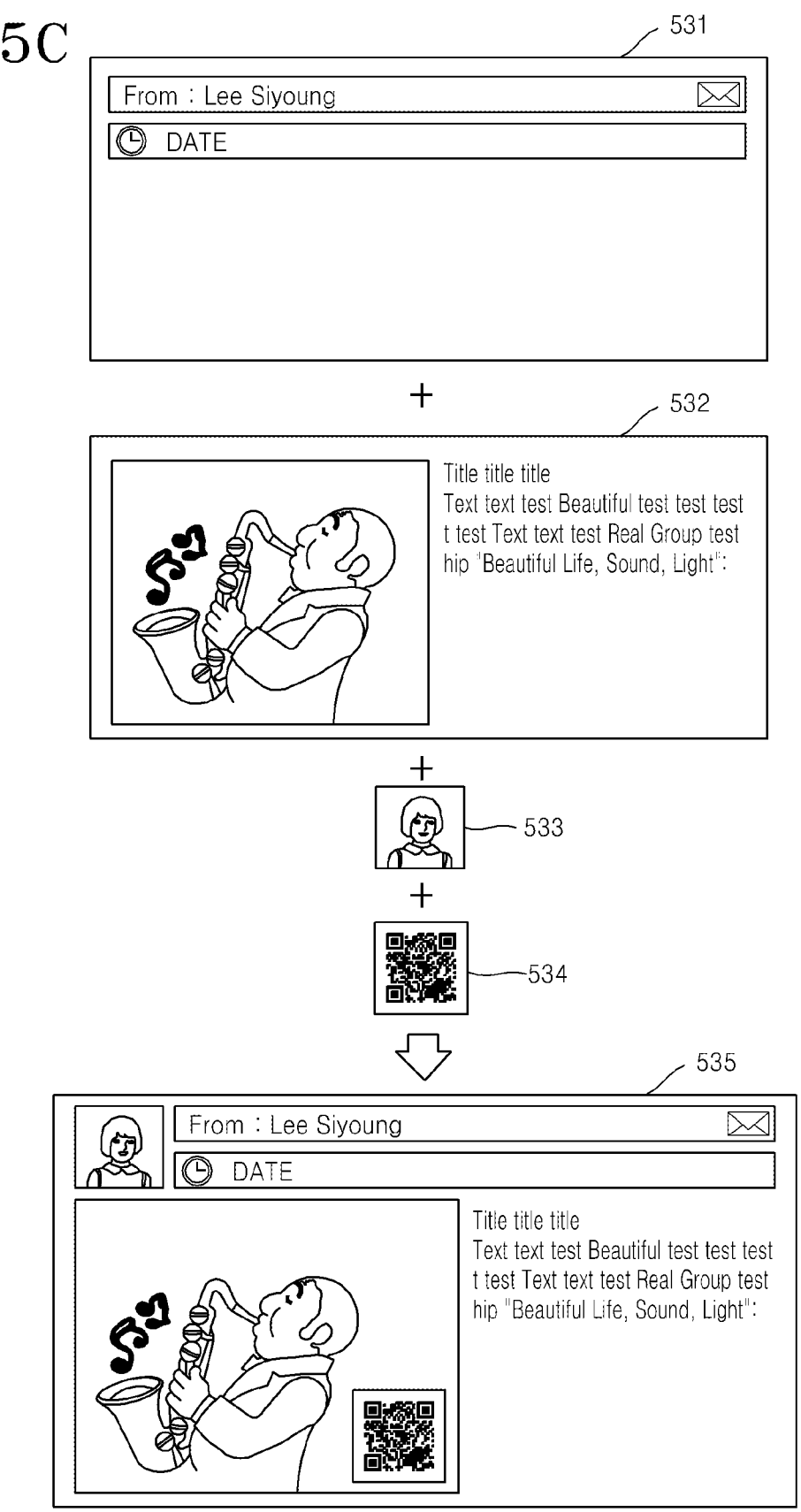

Referring to FIG. 5C, when a face image 533 and a QR code 534 are generated in operation S1003, the processor 204 stores an image file, which has an image, such as illustrated, for example, in a block 535, obtained by combining template graphic user interface information 531, an image 532 corresponding to a message to be transmitted, the face image 533 and the QR code 534, into the storage unit 202. Accordingly, an image file transmitted in operation S1007 may have an image corresponding to the block 535.

Meanwhile, the external network 120 of FIG. 1 is capable of transmitting the message and may include one of an M2M-based network, the internet, and a mobile communication network; however, it is not limited thereto. The external network 120 may be an external service network or an external access network; however, it is not limited thereto.

The local area network 150 of FIG. 1 may be based on a wireless protocol such as Zigbee, Wi-Fi, Bluetooth, IEEE802.11, Home Radio Frequency (HomeRF), Infrared Data Association (IrDA), ultra wideband (UWB) or wireless 1394, or may be based on a wire protocol such as Ethernet, Home Phoneline Networking Alliance (HomePNA), power line communications (PLC), Institute of Electrical and Electronics Engineers (IEEE) 1394 or universal serial bus (USB), and may be an indoor-based network or a home-based network; however, it is not limited thereto. Particularly, the local area network 150 may be a network compliant with a home network standard such as Digital Living Networking Alliance (DLNA) or homeshare capable of supporting the contents sharing between devices. The content sharing between devices can be performed by transmitting and receiving a content between devices.

The local area network 150 may be configured as a wire-wireless heterogeneous network. The local area network 150 is not limited to an indoor network because at least one of the first to nth devices 160_1 to 160_n may exist in an outdoor area. For instance, a mobile device may exist in an outdoor area due to its characteristics of mobility.

The first to nth devices 160_1 to 160_n of FIG. 1 are accessible, contents-sharable between devices and the gateway 140 and controllable by the gateway 140 through the local area network 150. For instance, when the first to nth devices 160_1 to 160_n of FIG. 1 are home-based devices, the first to nth devices 160_1 to 160_n may include a TV, a digital photo frame, a refrigerator, a washing machine, an air conditioner, a humidifier, an air cleaner, a boiler, a robot cleaner, a dishwasher, an oven, a mobile device, and/or mobile phone having an image display function; however, they are not limited thereto.

Also, the first to nth devices 160_1 to 160_n of FIG. 1 may be determined according to use of the area 130. For instance, if the area 130 is a home-based area, the first to nth devices 160_1 to 160_n may include the home-based devices. However, if the area 130 is an office-based area, the first to nth devices 160_1 to 160_n may be an office machine, an air cleaner, a mobile phone, and the like having an image display function.

The first to nth devices 160_1 to 160_n of FIG. 1 may include a device capable of receiving the 2G or 3G-based message and a device not capable of receiving the 2G or 3G-based message.

For instance, when the area 130 is a home-based area, a TV or an air cleaner may be capable of displaying an image but not capable of receiving both of 2G and 3G-based messages, a digital photo frame may be capable of displaying an image and also capable of receiving both of 2G and 3G-based messages, a mobile device may be capable of displaying an image and receiving a 2G-based message but not capable of receiving a 3G-based message.

In the area 130, an access to the first to nth devices 160_1 to 160_n by the gateway 140, contents sharing between the gateway 140 and the first to nth devices 160_1 to 160_n, and controlling the first to nth devices 160_1 to 160_n by the gateway 140 are possible through the local area network 150. The area 130 may be a space-based area such as a home, an office, an efficiency apartment and a factory. The first to nth devices 160_1 to 160_n may include a Non_DLNA device as listed in Table 1. The Non_DLNA device may not be capable of sharing contents with the gateway 140.

The gateway 140 may access the message transmitting device 110 through the external network 120, control at least one of the first to nth devices 160_1 to 160_n accessible through the local area network 150 as described above, and share contents with a DLNA-supportable device among the first to nth devices 160_1 to 160_n.

Therefore, the gateway 140 may be a device-controlling device capable of controlling the first to nth devices 160_1 to 160_n in the area 130, a mash-up service device accessible through the local area network 150 based on controlling at least one device, a home controller, a control point, a home network server or a home automation system combining a home gateway and a home server, and a remote home controller under an M2M environment.

The gateway 140 may transmit a message to a device not capable of directly receiving the message among the first to nth devices 160_1 to 160_n included in the area 130 according to an exemplary embodiment.

That is, if location information of an image file corresponding to the message and identification information (Device_D_www_zzz or Device_D_xxx_yyy in the case of Table 1) of a device to which a message is to be transmitted are received from the message transmitting device 110 through the external network 120, the gateway 140 may request for downloading an image file stored in the message transmitting device 110 based on the received location information. If the image file is downloaded from the message transmitting device 110, the gateway 140 makes the downloaded image file become contents using a DLNA technology based on the local area network 150. The image file made as contents is transmitted to a device to which a message is to be transmitted through the local area network 150.

If the device to which a message is to be transmitted is the second device 160_2, the gateway 140 transmits the image file made as contents to the second device 160_2 through the local area network 150 to thereby share the image file made as contents corresponding to a received message with the second device 160_2. If the second device 160_2 receives the image file, the received image file is rendered on the basis of DLNA and outputted through the second device 160_2. Accordingly, a user may receive a message of an image form through the second device.

In the case that the image outputted through the second device 160_2 is combined with a face image and/or a QR code as illustrated in the block 535 of FIG. 5C, a user may obtain additional information about a message transmitted based on an image, or try another operation related to an image file based on the obtained information. For instance, a QR code transmitted through the second device 160_2 may be photographed by a smart phone to access an image file stored in the message transmitting device 110 through the external network 120 based on the photographed QR code.

Figure 11:
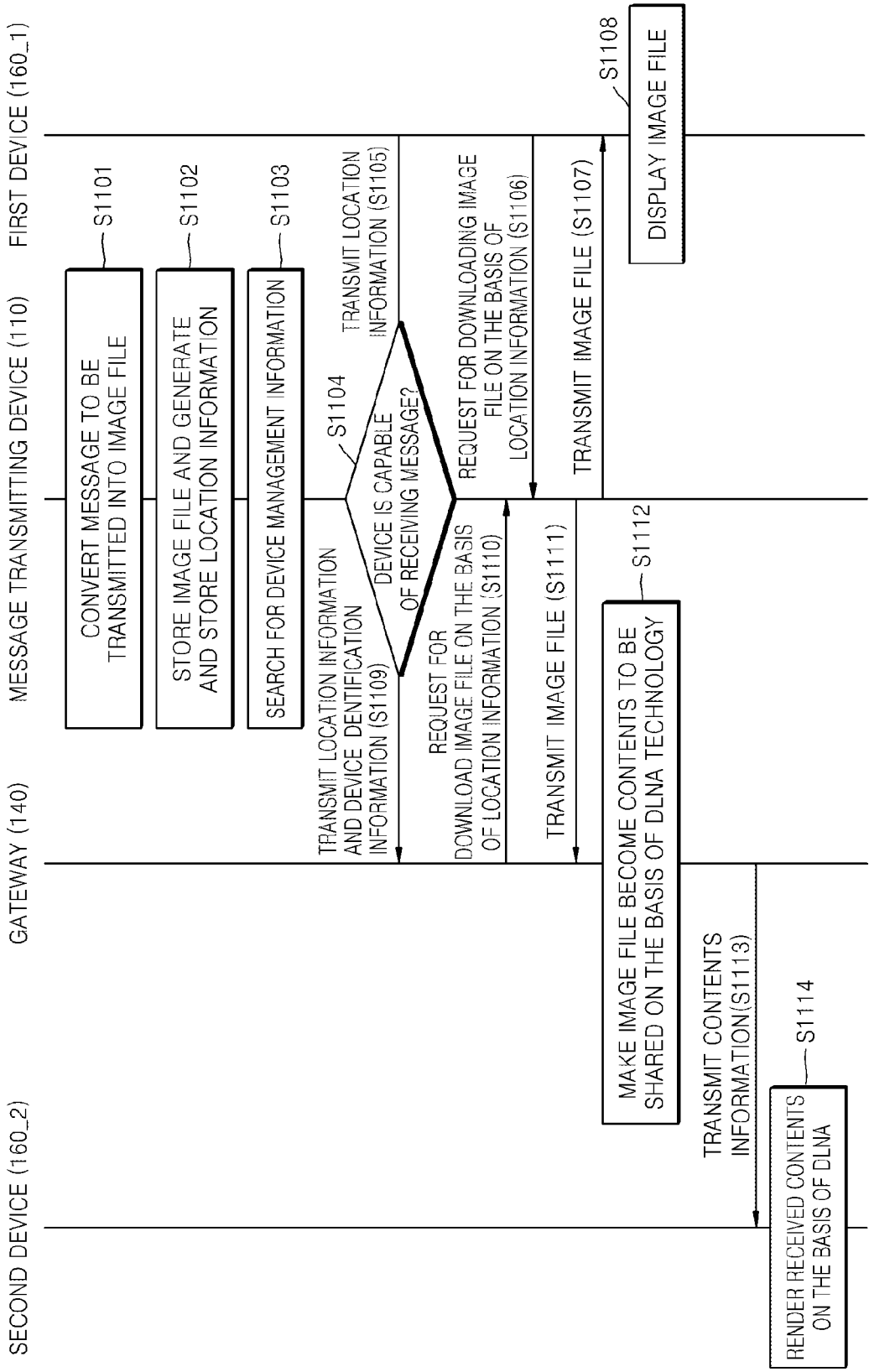
FIG. 11 is a diagram of a message transmitting method according to an exemplary embodiment.

The flowcharts of FIGS. 3 and 6 to 8 illustrating the message transmitting method based on the message transmitting device 110, the gateway 140, the first device 160_1 and the second device 160_2 included in the network 100 of FIG. 1 may be presented as illustrated in FIG. 11. FIG. 11 is a diagram of the message transmitting method according to an exemplary embodiment based on the network 100 of FIG. 1.

Referring to FIG. 11, in the message transmitting method according to an exemplary embodiment, a message to be transmitted is converted into an image file at the message transmitting device 110 in operation S1101, and then, the message transmitting device 110 stores the image file into the storage unit 202. The message transmitting device 110 generates location information of the stored image file, and stores the generated location information in operation S1102.

The message transmitting device 110 searches device management information in operation S1103. The message transmitting device 110 determines whether a device to which a message is to be transmitted is capable of receiving a message based on the found device management information in operation S1104. According to a result of the determination, if the device to which a message is to be transmitted is capable of receiving a message, the message transmitting device 110 transmits the location information to the first device 160_1 in operation S1105.

Accordingly, if the first device 160_1 requests downloading an image file based on the location information in operation S1106, the message transmitting device 110 reads an image file stored in the storage unit 202 and transmits the image file to the first device 160_1 in operation S1107. Accordingly, the first device 160_1 displays the received image file to thereby output a visualized message in operation S1108.

If it is determined that the device to which a message is to be transmitted is not capable of receiving a message, the message transmitting device 110 transmits location information and device identification information to the gateway 140 in operation S1109. The gateway 140 requests for downloading an image file from the message transmitting device 110 based on the received location information in operation S1110.

Accordingly, the message transmitting device 110 reads an image file from the storage unit 202 and transmits it to the gateway 140 in operation S1111. The gateway 140 makes the received image file become contents to be shared based on DLNA technology in operation S1112. The gateway 140 transmits contents information corresponding to an image file to the second device 160_2 based on the device identification information in operation S1113. The second device 160_2 renders the received contents information based on the DLNA in operation S1114. Accordingly, a user may see a visualized message through the second device 160_2.

Figure 12:
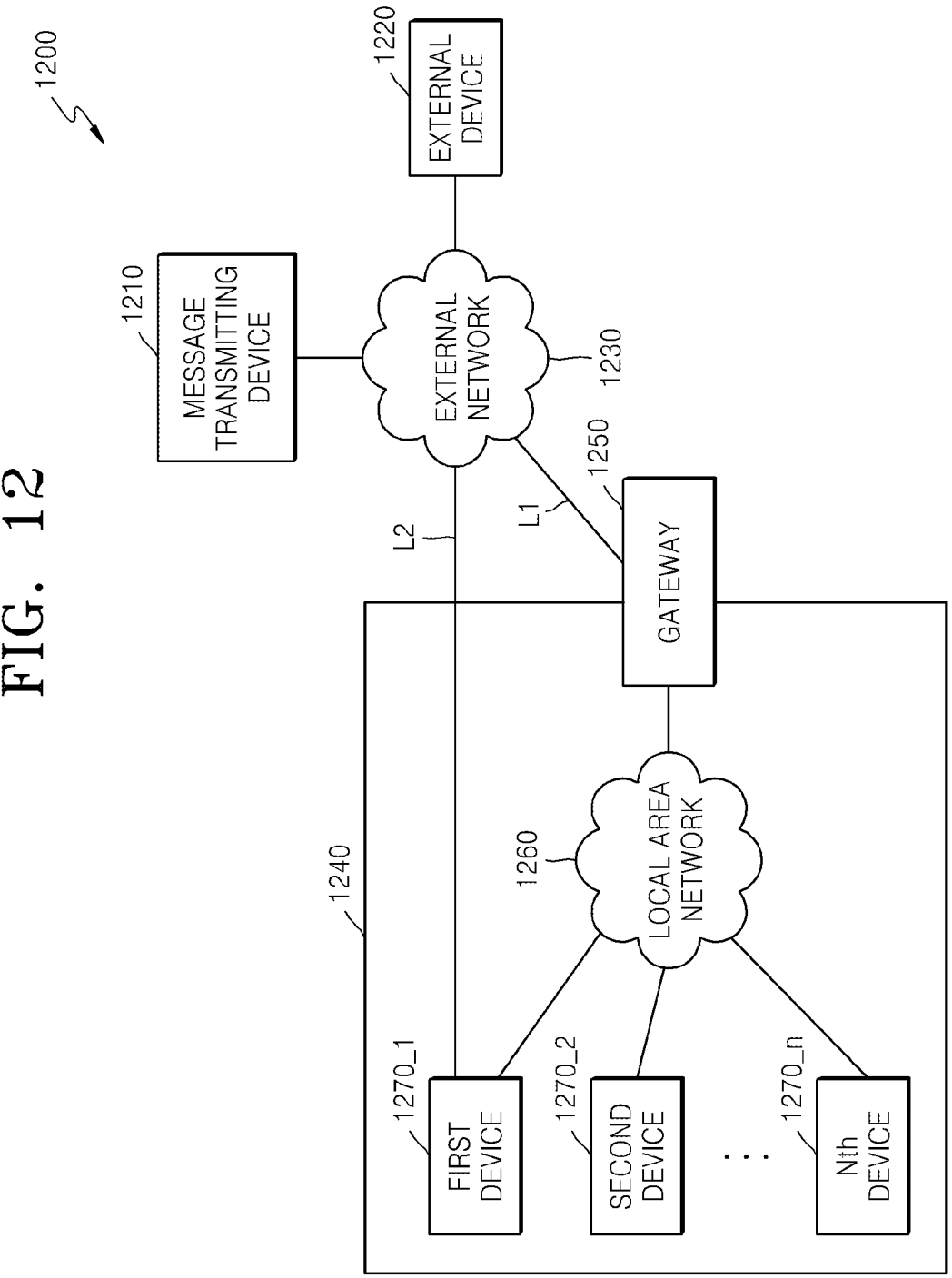
FIG. 12 is a diagram illustrating an exemplary configuration of a network to another exemplary embodiment.

FIG. 12 is a diagram illustrating an exemplary configuration of a network 120 based on a message transmitting device according to another exemplary embodiment. FIG. 12 illustrates the case where a message to be transmitted is received from an external device 1220.

An area 1240 including a gateway 1250 and first to nth devices 1270_1 to 1270_n connected based on a local area network 1260 illustrated in FIG. 12 may be substantially similar to the area 130 illustrated in FIG. 1, and thus detailed descriptions of them are omitted.

The external device 1220 is capable of generating a message based on the 2G or 3G technology and transmitting the generated message through an external network 1230. For instance, the external device 1220 may be a mobile device such as a smart phone.

If the message transmitting device 1210 receives a message from the external device 1220 through the external network 1230, the message transmitting device 1210 may transmit a visualized message to at least one device as illustrated in FIGS. 3 and 6 to 10. The message transmitting device 1210 may be a PC-based device such as the message transmitting device 110 illustrated in FIG. 1; however, it may be a server providing a message transmitting service.

Figure 13:
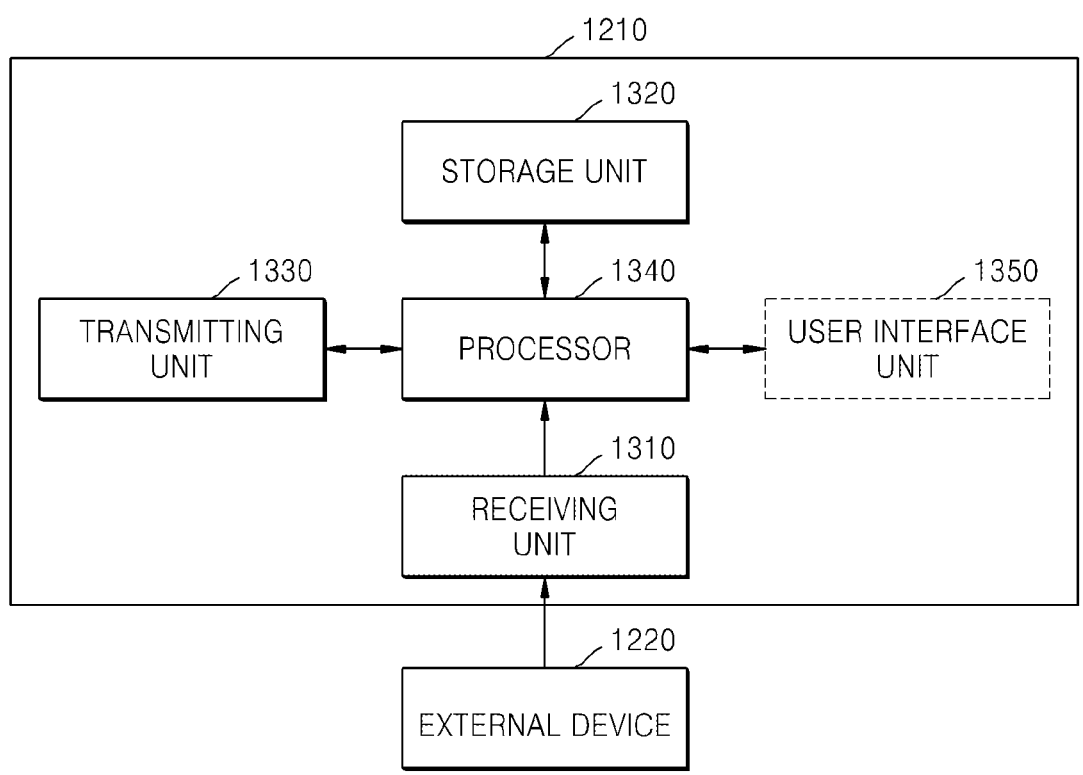
FIG. 13 is a detailed function block diagram of the message transmitting device illustrated in FIG. 12.

The message transmitting device 1210 may be configured as illustrated in FIG. 13.

Referring to FIG. 13, the message transmitting device 1210 may include a receiving unit 1310, a storage unit 1320, a transmitting unit 1330 and a processor 1340, and may or may not include a user interface unit 1350.

The receiving unit 1310 may receive a 2G or 3G-based SMS message or MMS message transmitted from the external device 1220 connected through the external network 1230. The receiving unit 1310 may be included in the transmitting unit 1330. That is, the message transmitting device 1210 may be configured so that the message is received through the transmitting unit 1330.

The processor 1340 may be operated as illustrated in FIG. 14. FIG. 14 is a flowchart illustrating a message transmitting method according to another exemplary embodiment.

Referring to FIG. 14, if the message is received through the receiving unit 1310 in operation S1401, the processor 1340 performs operations S1402 to S1405. Operations S1402, S1403, S1404, and S1405 are performed in substantially similar manner as operations S301 to S304 of FIG. 3.

Although the external network 1230 is similar to the external network 120 of FIG. 1, the external network 1230 may further include a network environment for making it possible to transfer data between the external device 1220 and the message transmitting device 1210. For instance, when the external device 1220 is a smart phone, the external network 1230 may include a 3G-based network.

The storage unit 1320, the transmitting unit 1330 and the user interface unit 1350 illustrated in FIG. 13 may be configured substantially similar to the storage unit 202, the transmitting unit 203 and the user interface unit 201 illustrated in FIG. 2.

Based on the network 1200 illustrated in FIG. 12, the message transmitting method illustrated in FIG. 11 may be modified to further include an operation for the message transmitting device 1210 to receive a message from the external device 1220.

Although above-described exemplary embodiments describe a technical feature of transmitting a visualized message corresponding to a message to a single device, exemplary embodiments may be modified to transmit the visualized message to multiple devices.

In addition, other exemplary embodiments can also be implemented through computer-readable code/instructions in/on a medium, such as a computer-readable medium, to control at least one processing element to implement any above-described exemplary embodiment. The medium can correspond to any medium/media permitting the storage and/or transmission of the computer-readable code. The computer-readable code can be recorded/transferred on a medium in a variety of ways, with examples of the medium including recording media, such as magnetic storage media (e.g., ROM, floppy disks, hard disks, etc.) and optical recording media (e.g., CD-ROMs, or DVDs), and transmission media such as Internet transmission media. Thus, the medium may be a defined and measurable structure including or carrying a signal or information, such as a device carrying a bitstream according to one or more exemplary embodiments. The media may also be a distributed network, so that the computer-readable code is stored/transferred and executed in a distributed fashion. Furthermore, the processing element could include a processor or a computer processor, and processing elements may be distributed and/or included in a single device.

The foregoing exemplary embodiments and advantages are merely exemplary and are not to be construed as limiting. The present teaching can be readily applied to other types of apparatuses. Also, the description of the exemplary embodiments is intended to be illustrative, and not to limit the scope of the claims, and many alternatives, modifications, and variations will be apparent to those skilled in the art.

What is claimed is:

1. A method of transmitting a message by a message transmitting device, the method comprising:
converting a message, to be transmitted to another device, into an image file;
storing the image file and generating location information about a location where the image file is stored;
determining whether the another device is capable of directly receiving the message converted as the image file, based on management information of the another device;
transmitting the image file to the another device based on a technology of sharing contents between devices if the another device is not capable of directly receiving the message; and
transmitting the location information to the another device to thereby transmit the image file to the another device if the another device is capable of directly receiving the message.

2. The method of claim 1, further comprising receiving the message to be transmitted from an external device.

3. The method of claim 1, further comprising receiving the message to be transmitted from a user interface unit.

4. The method of claim 1, wherein the transmitting the image file comprises:
transmitting the location information and identification information of the another device to a gateway; and
transmitting the image file to the gateway when a request for downloading the image file is received from the gateway, based on the location information,
wherein the gateway is connected to the another device, and has a function of sharing contents with the another device based on the technology of sharing contents.

5. The method of claim 1, wherein the transmitting the location information comprises:
transmitting the location information to the another device; and
transmitting the image file to the another device when a request for downloading the image file is received from the another device, based on the location information.

6. The method of claim 1, further comprising combining a template graphic user interface with an image of the image file.

7. The method of claim 6, further comprising:
generating information for linkage to meta-data of the image file; and
combining the information for linkage to the meta-data with the image of the image file.

8. The method of claim 7, wherein the information for linkage to the meta-data comprises at least one of a face image of an object included in the image and a quick response (QR) code.

9. The method of claim 1, further comprising:
generating information for linkage to meta-data of the image file; and
combining the information for linkage to meta-data with the image of the image file.

10. The method of claim 1, wherein the message comprises at least one of a text-based message and a multimedia-based message.

11. A non-transitory computer-readable recording medium having recorded thereon a program which, when executed by a processor, causes a message transmitting device to execute a method comprising:
converting a message to be transmitted to another device into an image file;
storing the image file and generating location information about a location where the image file is stored;
determining whether the another device is capable of directly receiving the message converted as the image file, based on management information of the another device;
transmitting the image file to the another device based on a technology of sharing contents between devices if the another device is not capable of directly receiving the message; and
transmitting the location information to the another device to thereby transmit the image file to the another device if the another device is capable of directly receiving the message.

12. A message transmitting device, comprising:
a storage unit configured to store an image file of a message to be transmitted and location information about a location where the image file is stored;
a processor configured to convert the message to be transmitted into the image file, generate the location information of the image file stored into the storage unit, and control the storage unit to store the location information into the storage unit; and
a transmitter which is controlled by the processor to transmit the image file to another device by:

determining whether the another device is capable of directly receiving the message converted as the image file, based on management information of the another device;

transmitting the image file to the another device based on a technology of sharing contents between devices if the another device is not capable of directly receiving the message; and transmitting the location information to the another device to thereby transmit the image file to the another device if the another device is capable of directly receiving the message.

13. The message transmitting device of claim 12, further comprising a user interface into which the message to be transmitted is input.

14. The message transmitting device of claim 12, further comprising a receiver configured to receive the message to be transmitted from an external device.

15. The message transmitting device of claim 14, wherein the storage unit is configured to store a management information table of the another device, and the processor is configured to search the management information table for the management information of the another device, determine whether the another device is capable of directly receiving the message based on the management information found in the storage unit, and control the transmitter to transmit the image file according to a result of a determination.

16. The message transmitting device of claim 15, wherein the processor is configured to control the transmitter to transmit the location information and identification information of the another device to a gateway if the another device is not capable of directly receiving the message according to the result of the determination, and wherein the gateway is connected to the another device, and transmits the image file corresponding to the message to the another device based on the technology of sharing contents between devices.

17. The message transmitting device of claim 12, wherein the processor is configured to combine a template graphic user interface with an image of the image file.

18. The message transmitting device of claim 17, wherein the processor is configured to generate information for linkage to meta-data of the image file, and combine the generated information for linkage to the meta-data with the image of the image file.

19. The message transmitting device of claim 18, wherein the information for linkage to the meta-data comprises at least one of a face image of an object included in the image and a quick response (QR) code.

20. A method comprising:

converting a text-based message or a media-based message into a visual message which is an image of a corresponding text-based message or media-based message;

storing an image file containing the image;

generating location information which identifies a location where the image file is stored;

determining whether a device is capable of directly receiving the visual message, based on management information of the device;

transmitting the image file to the device based on a technology of sharing contents between devices if the device is not capable of directly receiving the visual message; and transmitting the location information to the device to thereby transmit the image file to the device if the device is capable of directly receiving the visual message.

21. The method of claim 20, further comprising:

storing, in advance, management information about the device in a database;

searching the database for the management information of the device; and locating the management information for the device.

22. The method of claim 20, further comprising:

prior to the storing, combining a template graphic user interface with the image representing the corresponding text-based message or media-based message;

obtaining a combined image which represents an image of the template graphic user interface and the image of the corresponding text-based message or media-based message;

storing the combined image in the image file; and transmitting the image file containing the combined image.

23. The method of claim 22, further comprising:

prior to the transmitting the image file containing the combined image, generating information for linkage to meta-data of the image file;

combining the information for linkage to the meta-data with the combined image; and transmitting the image file containing the combined image with the linkage to the meta-data.

* * * * *